3,357,891
NOZZLE DEVICE IN FLOW TUBES OF A NUCLEAR REACTOR OF THE BOILING WATER TYPE
Lars Olof Tor Wadmark, Nasby Park, Sweden, assignor to Aktiebolaget Atomenergi, Stockholm, Sweden, a company of Sweden
Filed June 11, 1965, Ser. No. 463,208
Claims priority, application Sweden, June 25, 1964, 7,784/64
4 Claims. (Cl. 176—54)

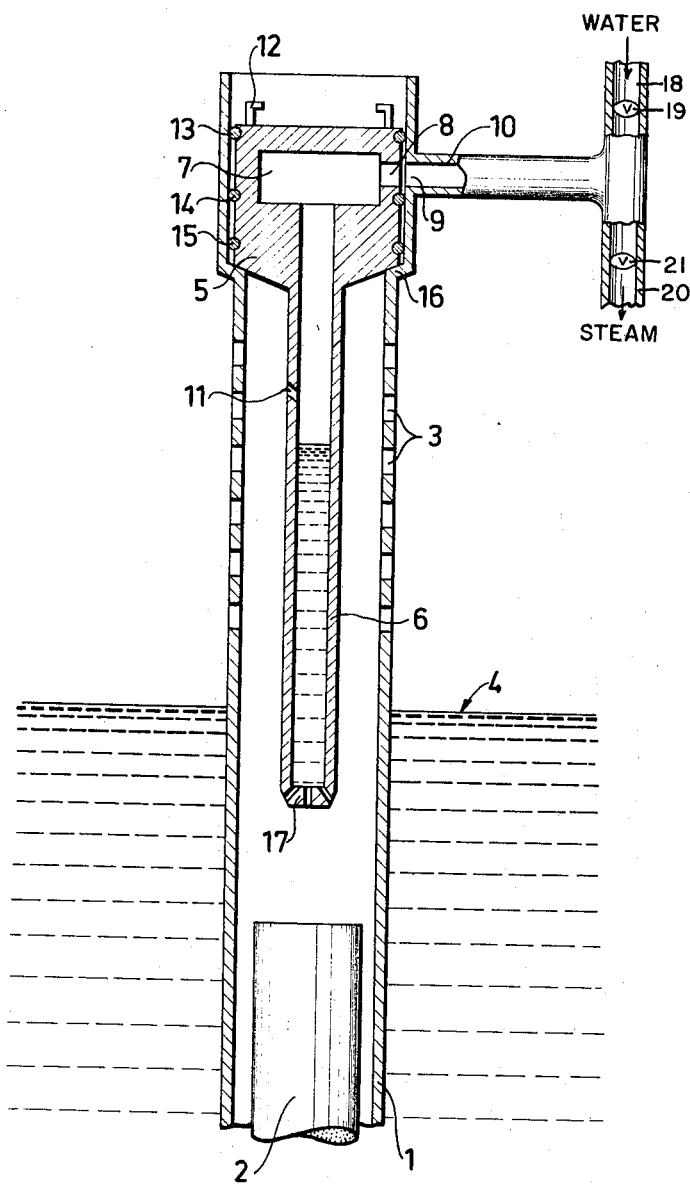

The invention relates to a device in a nuclear reactor of the boiling water type, in which the nuclear fuel is enclosed in vertical flow tubes. It is the object of the invention to provide a device which allows cooling water to be sprayed on the fissile fuel, for instance when the cooling agent in the reactor tank is to be changed or when the ordinary cooling water has been lost in a reactor accident, and which further allows steam to be withdrawn from the flow tubes so as to make it possible to determine whether the steam from a predetermined flow tube contains fission gas, this being an indication that a fuel element has been damaged.

The device according to the invention is characterized by a nozzle in the upper portion of the flow tube, said flow tube having in its wall openings for the ascending mixture of water and steam, said nozzle comprising a head connected to a conduit for the supply of cooling water and for the discharge of steam, said nozzle further comprising a tube situated centrally in the flow tube and having its upper end connected to the head and having its lower end situated comparatively close to the fissile fuel to allow cooling water to be sprayed, when desired, onto the fissile fuel, the wall of the nozzle tube containing at least one opening comparatively close to the head for discharging steam from the flow tube.

The invention will be described below with reference to the accompanying drawing which illustrates the upper portion of a flow tube 1 containing a fuel element 2. The wall of the flow tube contains openings 3 for the ascending mixture of steam and water, said openings being situated on a level above the normal water surface 4. The steam leaves the reactor in a way known per se.

The flow tube contains a nozzle comprising a cylindrical head 5 and a tube 6 extending downward from the head centrally into the flow tube. The tube 6 is connected to a cavity 7 in the head, said cavity 7 being connected with an opening 9 in the wall of the flow tube, via an opening 8 in the wall of the head. The opening 9 is connected to a conduit 10 which in turn is connected to a conduit 18 having a valve 19 for supplying cooling water and to a conduit 20 having a valve 21 for collecting steam from the flow tube. The tube 6 is provided with one or more openings 11 comparatively close to the head 5, so as to be with certainty higher than the normal water surface in the tube 6. The tube 6 has such a length as to extend below the lowermost opening 3, and it may have a spray member 17 comparatively close to the upper portion of the fuel element 2.

The head 5 has on its upper portion means 12 for being lifted by a lifting device which is mounted in the reactor as known per se. Three grooves are provided in the side wall of the head, and said grooves contain sealing rings 13, 14 and 15. In the illustrated position, in which the head 5 is supported by a shoulder 16 in the wall of the flow tube, the opening 9 is situated between the sealing rings 13 and 14. If the head 5 is lifted so far that the opening 9 will be situated between the sealing rings 14 and 15 the conduit 10 will be shut off from the cavity 7 and from the interior of the flow tube 1.

The illustrated device works as follows. When cooling water is supplied through the conduits 10 and 18 the fuel element 2 is thoroughly cooled owing to the fact that the nozzle tube 6 is directed towards the fuel element and ends close to said element. The quantity of cooling water flowing out through the opening or openings 11 is so small that it can be neglected. When it is desired to find out whether there is a leakage of fission gas steam is released through the conduits 10 and 20, if necessary by means of suction means, and the presence of fission gas in the steam is investigated. The steam flows into the nozzle tube 6 through the opening 11.

The conduits 10 belonging to a plurality, for instance four, of flow tubes should preferably be joined to form a main conduit. When fission gas has been found in the steam in the main conduit it is easy to find the flow tube from which the fission gas originates, namely by lifting the heads 5 of the flow tubes successively, so as to shut off the corresponding conduits 10 as described above.

What is claimed is:
1. In combination with a nuclear reaction of the boiling water type in which nuclear fuel is positioned in vertical flow tubes containing water which vaporizes and ascends therethrough, the improvement comprising a nozzle supported in the upper portion of each flow tube, each said flow tube having in its wall openings for the ascending water and steam mixture, said nozzle comprising a head connected to a conduit adapted to alternately supply cooling water or provide for the discharge of steam, said nozzle further comprising a tube situated centrally in the flow tube and having its upper end connected to the head and having its lower end situated comparatively close to the fissile fuel to allow cooling water to be sprayed onto the fissile fuel, the wall of the nozzle tube containing at least one opening comparatively close to the head for discharging steam from the flow tube.

2. A combination as claimed in claim 1, wherein the head is slidable in the flow tube and has means for being seized by a lifting device.

3. A combination as claimed in claim 2, wherein the head consists of a hollow cylindrical body having in its side wall an opening registering in a first position with an opening in the wall of the flow tube, said latter opening being connected to the conduit for the supply of cooling water and for the discharge of steam, the head being movable from said first position to a second position in which the opening in the wall of the head is shut off from the opening in the wall of the flow tube.

4. A combination as claimed in claim 3 comprising three sealing rings provided in circumferential grooves in the side wall of the head, the opening in said side wall being situated between the two upper sealing rings.

References Cited
UNITED STATES PATENTS 2,861,033   11/1958   Treshow _____ 176—56
2,926,127   2/1960    McCorkle _____ 176—64
3,223,589   12/1965   Ziegler _____ 176—54

L. DEWAYNE RUTLEDGE, *Primary Examiner.*